US010655502B2

(12) United States Patent
Barainca et al.

(10) Patent No.: US 10,655,502 B2
(45) Date of Patent: May 19, 2020

(54) STATOR ASSEMBLY WITH RETENTION CLIP FOR GAS TURBINE ENGINE

(71) Applicant: United Technologies Corporation, Farmington, CT (US)

(72) Inventors: Brian Barainca, Kennebunk, ME (US); Gary F. Fowler, Strafford, NH (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 322 days.

(21) Appl. No.: 15/606,005

(22) Filed: May 26, 2017

(65) Prior Publication Data

US 2018/0340449 A1    Nov. 29, 2018

(51) Int. Cl.
| F01D 1/02 | (2006.01) |
| F01D 25/24 | (2006.01) |
| F01D 9/04 | (2006.01) |

(52) U.S. Cl.
CPC ............ *F01D 25/246* (2013.01); *F01D 9/042* (2013.01); *F05D 2230/60* (2013.01); *F05D 2230/64* (2013.01); *F05D 2260/30* (2013.01); *F05D 2300/43* (2013.01); *F05D 2300/501* (2013.01)

(58) Field of Classification Search
CPC ...... F01D 25/246; F01D 9/042; F01D 5/3023; F01D 5/303; F01D 11/12; F01D 2240/12; F05D 2260/31; F05D 2260/38; F05D 2260/36; F05D 2250/75; F05D 2230/64; Y10T 403/7075; F16B 21/12
See application file for complete search history.

(56) References Cited

U.S. PATENT DOCUMENTS

| 6,409,472 | B1 | 6/2002 | McMahon et al. |
| 6,655,912 | B2 | 12/2003 | Bos |
| 2014/0147262 | A1* | 5/2014 | Grelin ..................... F01D 9/042 |
| | | | 415/191 |
| 2014/0356158 | A1 | 12/2014 | Barnett |
| 2018/0010470 | A1* | 1/2018 | Baumann ................ F01D 9/041 |
| 2018/0010472 | A1* | 1/2018 | Baumann ................ F01D 9/041 |

(Continued)

FOREIGN PATENT DOCUMENTS

| EP | 1079075 | 2/2001 |
| EP | 2072760 | 6/2009 |
| FR | 2671140 | 7/1992 |

OTHER PUBLICATIONS

European Search Report for European Patent Application No. 18173437 completed Aug. 1, 2018.

*Primary Examiner* — John Kwon
(74) *Attorney, Agent, or Firm* — Carlson, Gaskey & Olds, P.C.

(57) ABSTRACT

A stator assembly of a gas turbine engine according to an example of the present disclosure includes, among other things, a first shroud extending about an axis to bound a flow path. The first shroud defines a first shroud opening. An airfoil has an airfoil body extending from a first end portion. The first end portion is received in the first shroud opening and defines at least one airfoil opening. At least one retention clip has an arcuate portion extending from a first elongated leg portion. The first elongated leg portion and the arcuate portion are received through the at least one airfoil opening such that the at least one retention clip limits movement of the airfoil relative to the first shroud.

24 Claims, 6 Drawing Sheets

(56) References Cited

U.S. PATENT DOCUMENTS

| | | | |
|---|---|---|---|
| 2018/0051579 A1* | 2/2018 | Montgomery | F01D 9/042 |
| 2018/0340432 A1* | 11/2018 | Barainca | F01D 9/042 |
| 2018/0340448 A1* | 11/2018 | Barainca | F01D 25/246 |
| 2018/0340449 A1* | 11/2018 | Barainca | F01D 25/246 |
| 2018/0355737 A1* | 12/2018 | Barainca | F01D 9/042 |
| 2019/0010816 A1* | 1/2019 | Barainca | F01D 9/042 |

* cited by examiner

STATOR ASSEMBLY WITH RETENTION CLIP FOR GAS TURBINE ENGINE

BACKGROUND

This application relates to retention of components for a gas turbine engine, such as retention of a stator assembly.

Gas turbine engines are known, and typically include a fan delivering air into a low pressure compressor section. The air is compressed in the low pressure compressor section, and passed into a high pressure compressor section. From the high pressure compressor section the air is introduced into a combustion section where it is mixed with fuel and ignited. Products of this combustion pass downstream over a high pressure turbine section, and then a low pressure turbine section to extract energy for driving the fan.

Gas turbine engines typically include a stator assembly including airfoils to guide flow through a flow path. The airfoils are secured to portions of the stator assembly.

SUMMARY

A stator assembly of a gas turbine engine according to an example of the present disclosure includes a first shroud extending about an axis to bound a flow path. The first shroud defines a first shroud opening. An airfoil has an airfoil body extending from a first end portion. The first end portion is received in the first shroud opening and defines at least one airfoil opening. At least one retention clip has an arcuate portion extending from a first elongated leg portion. The first elongated leg portion and the arcuate portion are received through the at least one airfoil opening such that the at least one retention clip limits movement of the airfoil relative to the first shroud.

In a further embodiment of any of the foregoing embodiments, a length of the first elongated leg portion tapers toward the arcuate portion.

In a further embodiment of any of the foregoing embodiments, the at least one retention clip includes an intermediate portion connecting the first elongated leg portion and a second elongated leg portion.

In a further embodiment of any of the foregoing embodiments, the intermediate portion extends a first length and the arcuate portion extends a second, different length such that a free end of the arcuate portion is offset from an axis defined by the second elongated leg portion.

In a further embodiment of any of the foregoing embodiments, the intermediate portion extends outward from the first and second elongated leg portions.

In a further embodiment of any of the foregoing embodiments, the at least one airfoil opening includes a pair of airfoil openings, and the intermediate portion spans between the pair of airfoil openings when the at least one retention clip is located in an installed position.

In a further embodiment of any of the foregoing embodiments, the first elongated leg portion includes at least one undulation that abuts against the first end portion of the airfoil when the at least one retention clip is located in an installed position.

A further embodiment of any of the foregoing embodiments includes a retention member formed adjacent to the first end portion to trap the at least one retention clip.

In a further embodiment of any of the foregoing embodiments, the first shroud bounds a radially inner portion of the flow path, and a second shroud bounds a radially outer portion of the flow path.

In a further embodiment of any of the foregoing embodiments, the stator assembly is situated in a bypass duct.

A gas turbine engine according to an example of the present disclosure includes, a fan section that has a plurality of fan blades rotatable about an engine axis, a compressor section in fluid communication with the fan section, a turbine section driving the fan section, and a stator assembly that has a first shroud and a second shroud each extending about the engine axis. The first shroud defines an array of first openings, and the second shroud defines an array of second openings. A plurality of airfoils each have an airfoil body extending between first and second end portions. The first end portion is situated in a respective one of the array of first openings, and the second end portion is situated in a respective one of the array of second openings. A plurality of retention clips each have an arcuate portion extending from a first elongated leg portion. Each first end portion receives a respective one of the plurality of retention clips to limit movement of the plurality of airfoils.

In a further embodiment of any of the foregoing embodiments, the stator assembly is situated in bypass flow path aft of the fan section.

In a further embodiment of any of the foregoing embodiments, the stator assembly is an inlet guide vane assembly forward of the compressor section.

A further embodiment of any of the foregoing embodiments includes a first retention member formed adjacent to each first end portion to trap the plurality of retention clips.

In a further embodiment of any of the foregoing embodiments, each second end portion receives a respective one of the plurality of retention clips to limit movement of the plurality of airfoils.

A method of assembling a stator assembly for a gas turbine engine according to an example of the present disclosure includes providing a shroud defining a shroud opening, and moving an end portion of an airfoil into the shroud opening. The end portion defines at least one airfoil opening moving an arcuate portion of a retention clip through the at least one airfoil opening. The method includes the step of moving a first elongated leg portion of the retention clip through the at least one airfoil opening such that the retention clip limits movement of the airfoil relative to the shroud. The arcuate portion extends from an end of the first elongated leg portion.

In a further embodiment of any of the foregoing embodiments, the step of moving the arcuate portion includes rotating the retention clip relative to an axis defined by the first elongated leg portion.

In a further embodiment of any of the foregoing embodiments, the at least one airfoil opening includes a pair of airfoil openings, and the step of moving the first elongated leg portion includes simultaneously sliding the first elongated leg portion and a second elongated leg portion of the retention clip a distance through the pair of airfoil openings.

A further embodiment of any of the foregoing embodiments includes forming a first retention member adjacent to the end portion to encase at least a portion of the retention clip and oppose withdraw of the first and second leg portions from the pair of airfoil openings.

In a further embodiment of any of the foregoing embodiments, the shroud defines a portion of a bypass flow path downstream of a fan.

The details of one or more embodiments are set forth in the accompanying drawings and the description below.

Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
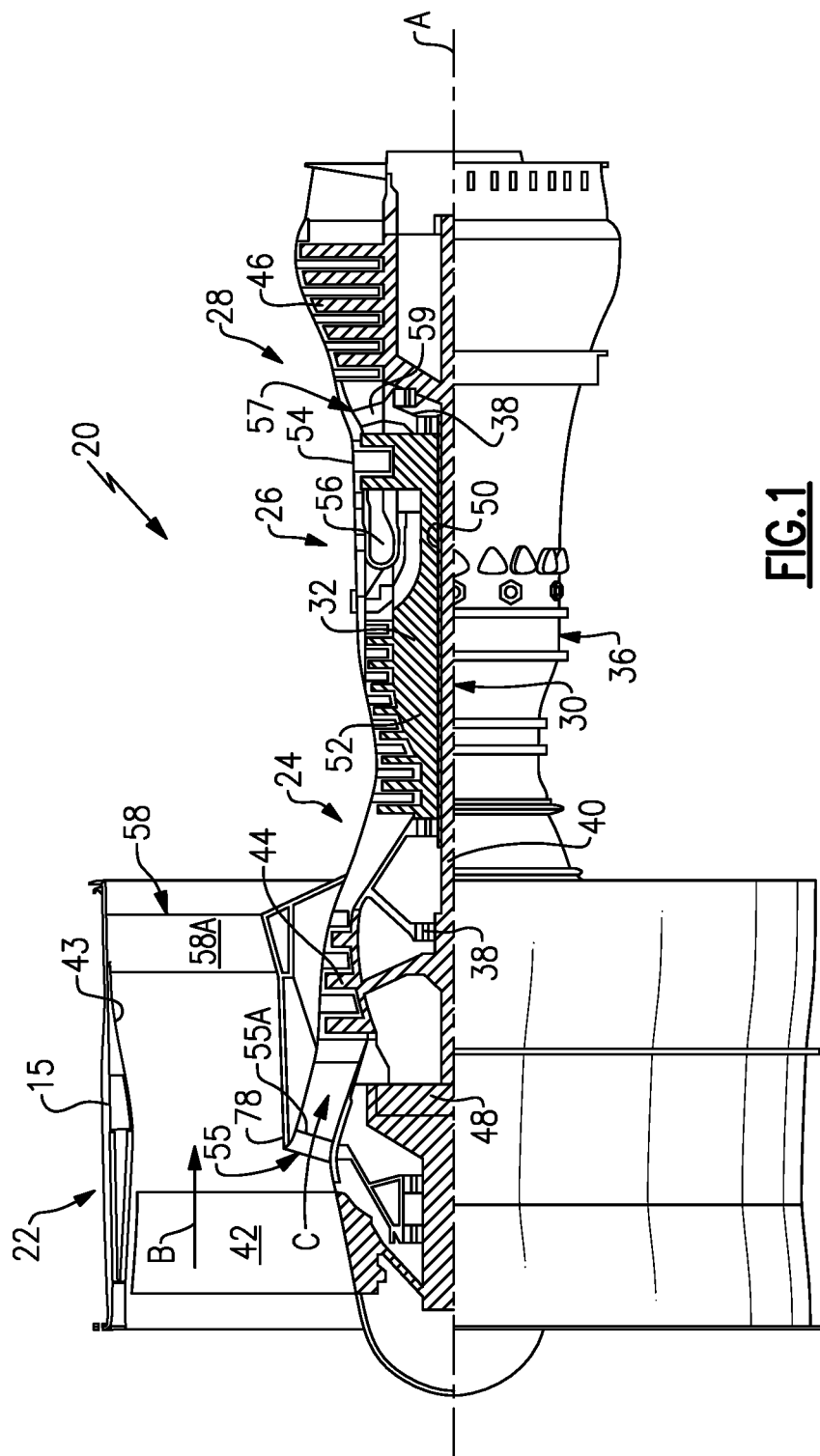
FIG. 1 illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 meters/second).

The engine 20 can include a structural guide vane (SGV) or bypass guide vane system 58 situated aft of the fan 42 in a bypass duct 43 defining the bypass flow path B. The bypass guide vane system 58 can include a plurality of airfoils 58A (one shown in FIG. 1) extending radially between an inner diameter and outer diameter of the bypass duct 43.

The engine 20 can include a fan exit stator (FES) or inlet guide vane assembly 55 downstream of the fan 42 and radially inward of a splitter 78. The inlet guide vane assembly 55 directs flow along the core flow path C from the fan 42 into the compressor section 24. The inlet guide vane assembly 55 can include a plurality of airfoils 55A (one shown in FIG. 1) arranged circumferentially about the engine central longitudinal axis A.

Figure 2:
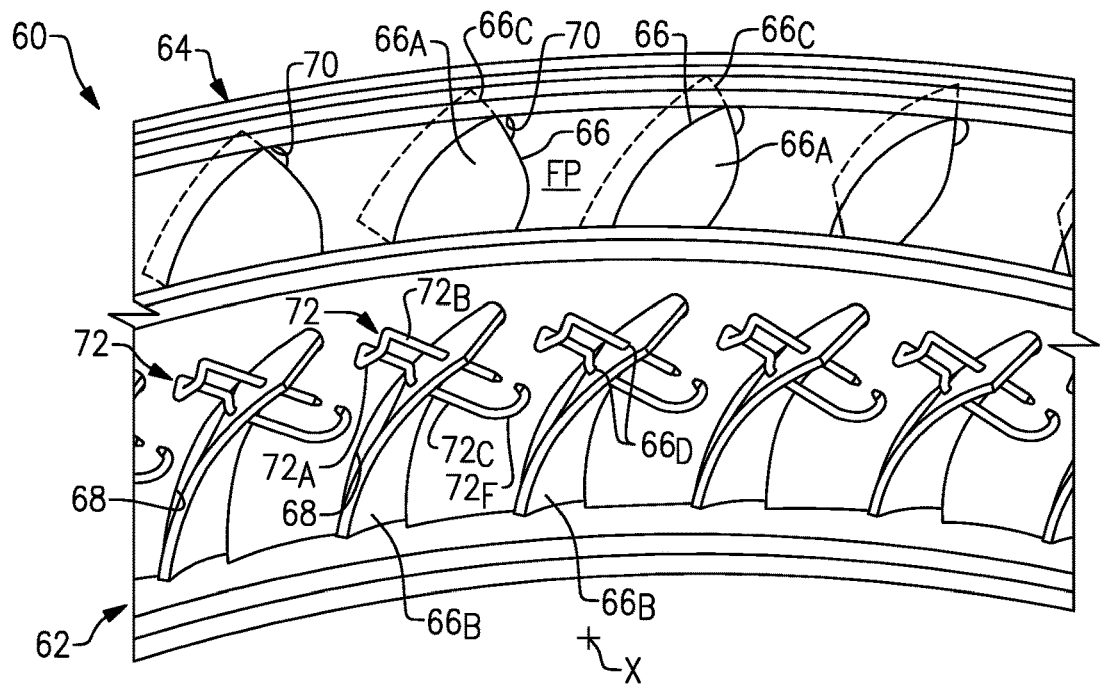
FIG. 2 illustrates a perspective view of an example stator assembly.
Figure 3:
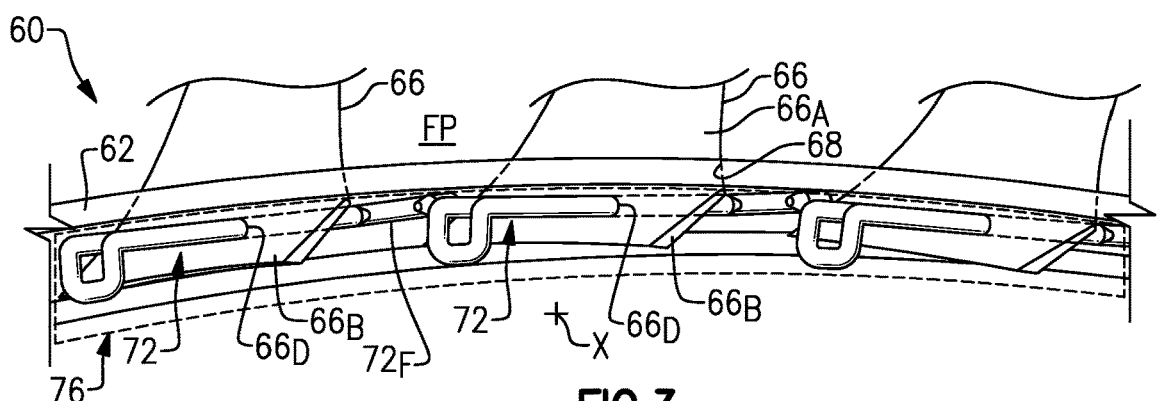
FIG. 3 illustrates a perspective view of a portion of the stator assembly of FIG. 2.
Figure 4:
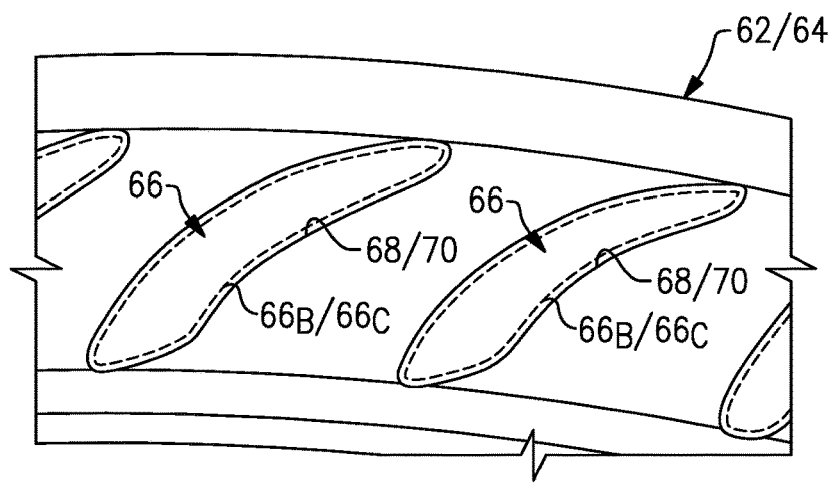
FIG. 4 illustrates a portion of a shroud of the stator assembly of FIG. 2.

FIGS. 2-4 illustrate an example stator assembly 60 for guiding airflow through a flow path. In some examples, the stator assembly 60 is a portion of the inlet guide vane assembly 55 and/or the bypass guide vane system 58. The stator assembly 60 can also be utilized in the compressor section 24, turbine section 28 or mid-turbine frame 57. Other portions and components of the engine 20 can also benefit from the teachings herein, such as retention of combustor panels in the combustor section 26 or blade outer air seals (BOAS) in the turbine section 28.

The stator assembly 60 includes an inner (or first) shroud 62 and an outer (or second) shroud 64 each extending about an assembly axis X to bound a flow path FP. The flow path FP may correspond to a portion of the bypass flow path B and/or the core flow path C, and the assembly axis X may correspond to the engine central longitudinal axis A in FIG. 1, for example. The stator assembly 60 includes an array of airfoils 66 that are arranged circumferentially about the assembly axis X to guide or direct flow through the flow path FP. Each of the airfoils 66 includes an airfoil body 66A that extends between a first end portion 66B and a second end portion 66C (shown in dashed lines in FIG. 2).

The inner shroud 62 defines an array of inner (or first) shroud openings 68, and the outer shroud 64 defines an array of outer (or second) shroud openings 70 (FIG. 2). As illustrated by FIG. 4, the shroud openings 68, 70 can be generally contoured relative to a perimeter of respective first and second end portions 66B, 66C of the airfoils 66 (shown in dashed lines).

The shroud openings 68, 70 receive respective first and second end portions 66B, 66C of the airfoils 66. For example, the inner shroud 62 can be positioned relative to the assembly axis X, with each of the airfoils 66 moved in a radially inward direction to be received in one of the first shroud openings 68. Thereafter, the outer shroud 64 can be moved radially inward to position the second end portion 66C of the airfoils 66 in the second shroud openings 70.

Figure 5:
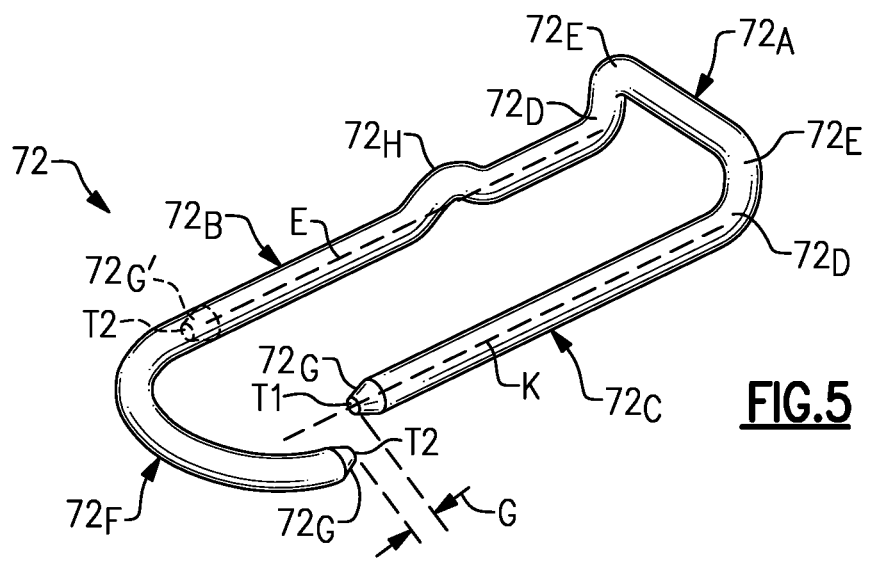
FIG. 5 illustrates a retention clip.

Referring to FIG. 5 with continued reference to FIGS. 2-4, the stator assembly 60 includes a plurality of retention clips 72 for selectively securing the airfoils 66 to the inner shroud 62 and/or the outer shroud 64. Each retention clip 72 includes an intermediate portion 72A connecting a pair of elongated leg portions, including a first elongated leg portion 72B and a second elongated leg portion 72C. The retention clip 72 can be formed from an extrusion process and made of a tempered metal or metal alloy, for example, with retention clip 72 having a substantially uniform cross-section between terminal ends T1, T2, including along the leg portions 72B, 72C and the intermediate portion 72A. This technique can reduce the cost of fabricating the retention clips 72. Other example techniques for fabricating the retention clips 72 can include a casting or machining process. In some examples, the retention clip 72 is formed of a non-metallic material such as a plastic or composite.

The leg portion 72B defines an axis E and the leg portion 72C defines an axis K, which can be transverse or substantially parallel to the axis E. The leg portions 72B, 72C can have a generally elliptical cross-section, such a substantially round cross-section. In another example, the leg portions 72B, 72C have a generally rectangular cross-section. In the illustrated example of FIG. 5, the first leg portion 72B extends a first distance, and the second leg portion 72C extends a second distance that is less than the first distance. In other examples, the leg portions 72B, 72C can extend substantially the same length.

The intermediate portion 72A is connected to each of the leg portions 72B, 72C by a pair of outward bends 72D and a pair of lateral bends 72E. The outward bends 72D can have a generally right angle profile or can otherwise be transverse to the leg portions 72B, 72C such that the intermediate portion 72A extends outward from the leg portions 72B, 72C. The outwardly extending arrangement of the intermediate portion 72A can assist an operator in installing and/or uninstalling the retention clip 72.

The retention clip 72 can include a hook or arcuate portion 72F extending from the first leg portion 72B to define the terminal end T2. In the illustrated example of FIG. 5, the arcuate portion 72F has a generally C-shaped profile. In other examples, the arcuate portion 72F extends along an arc corresponding to an angle that is less or greater than about 180 degrees, such as between about 20 degrees to about 210 degrees. In some examples, the arcuate portion 72F is omitted such that the first leg portion 72B defines terminal end T2' and which can have a tapered portion 72G'.

Figure 6:
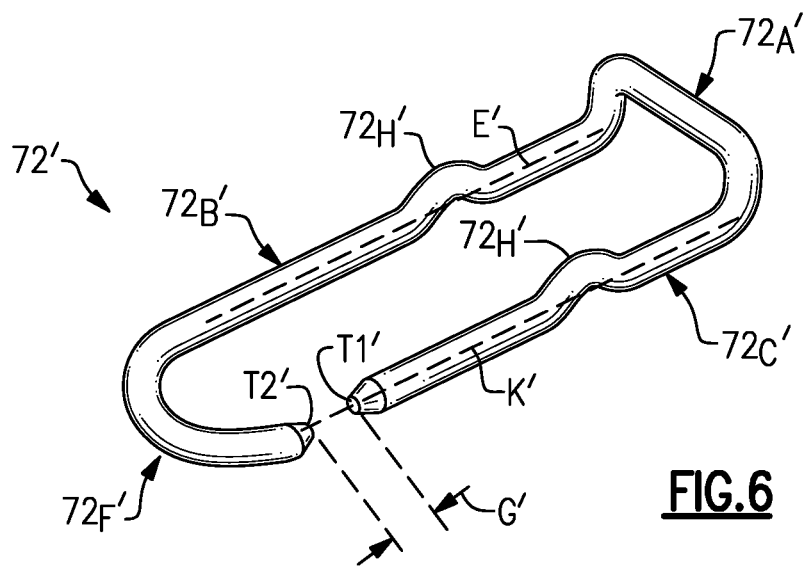
FIG. 6 illustrates a retention clip according to a second example.

The intermediate portion 72A can extend a first length and the arcuate portion 72F can extend a second, different length such that the terminal (or free) end T2 of the arcuate portion 72F is offset from the axis K defined by the second leg portion 72C and the terminal end T1. The terminal end T2 is positioned outward of the terminal end T1 relative to the axis K. In the example retention clip 72' of FIG. 6, terminal end T2' is substantially aligned along axis K' defined by second leg portion 72C'. In other examples, the terminal end T2 is positioned inward of the terminal end T1.

The arcuate portion 72F is defined such that terminal ends T1, T2 define a gap G. The gap G can be greater than a thickness of the corresponding end portion 66B, 66C, for example, to permit full withdraw of the second leg portion 72C and rotation of the first leg portion 72B while the first leg portion 72B is at least partially disposed in the corresponding end portion 66B, 66C of the airfoil 66. When in the installed position, the arcuate portion 72F resists withdraw of the retention clip 72 relative to the respective shroud 62, 64 by abutment with the corresponding end portion 66B, 66C of the airfoil 66.

Figure 7:
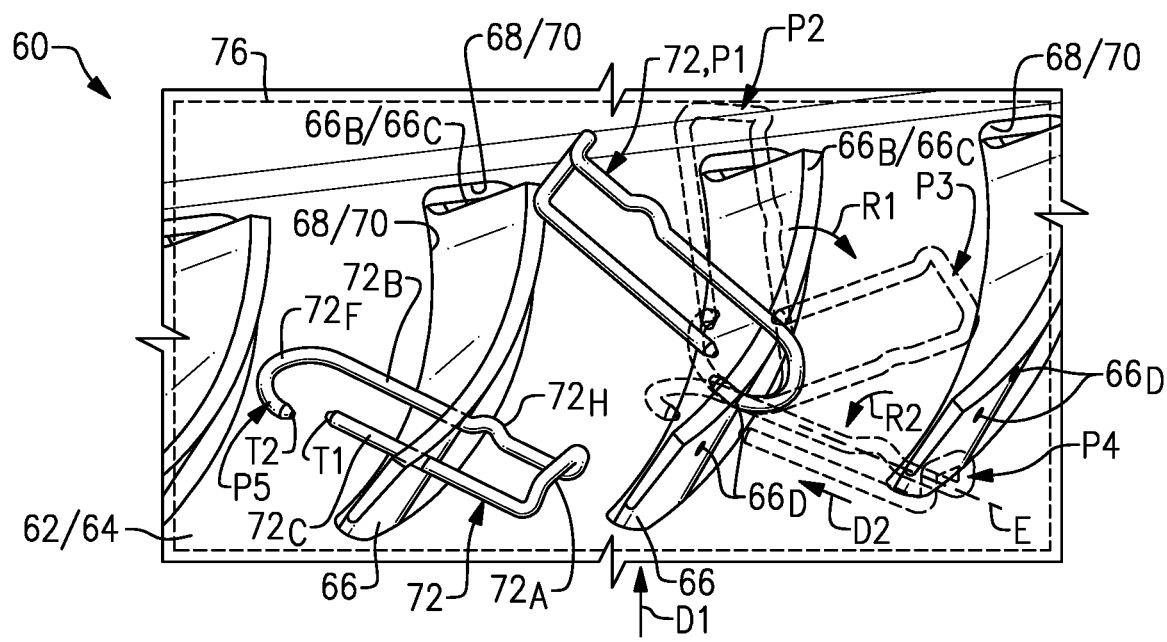
FIG. 7 illustrates perspective view of the stator assembly of FIG. 2 with the retention clip of FIG. 5 located in several positions.

The first and/or second end portions 66B, 66C of the airfoils 66 define a plurality of airfoil openings 66D (FIG. 7). The airfoil openings 66D and respective passages through the end portions 66B, 66C can have a generally complementary profile with respect to a cross-section of the leg portions 72B, 72C of the retention clip 72. The leg portions 72B, 72C are received in a respective pair of airfoil openings 66D such that the retention clip 72 limits or bounds movement of the airfoil 66 relative to at least one of the shrouds 62, 64. The terminal ends T1, T2 of the retention clip 72 can have a tapered portion 72G to assist in guiding the arcuate portion 72F and the leg portion 72C through the airfoil openings 66D. The intermediate portion 72A can be dimensioned to span between the pair of airfoil openings 66D when the retention clip 72 is located in an installed position. The airfoil openings 66D can be defined at a position relative to the first and/or second end portions 66B, 66C of the airfoils 66 such that the retention clips 72 are spaced a distance from the respective shrouds 62, 64 to accommodate tolerance stack ups of the stator assembly 60 and reduce a likelihood of corrosion in examples in which the different materials of the components are utilized.

The first leg portion 72B and/or the second leg portion 72C can be contoured to define an undulation 72H for abutment with one of the end portions 66B, 66C of an adjacent airfoil 66 when the retention clip 72 is located in an installed position. Each undulation 72H can extend outward relative to an axis of the respective one of the leg portions 72B, 72C along a desired orientation. In the illustrated example of FIGS. 5 and 6, the undulations 72H, 72H' extend generally perpendicular relative to a reference plane defined through the leg portions 72B, 72C (FIGS. 2 and 3), which may be correspond to a generally radial direction relative to the assembly axis X when in the installed position. Each undulation 72H can be defined along the respective leg portion 72B, 72C such that the leg portions 72B, 72C extend through the airfoil openings 66D at a desired distance or depth. In the illustrated example, the undulation 72H is defined such that opposite ends of the leg portions 72B, 72C are positioned approximately equidistant from the corresponding airfoil openings 66D to reduce a likelihood of rocking of the retention clip 72 about the respective end portion 66B, 66C. In another example, the first leg portion 72B and/or the second leg portion 72C is tapered a distance from the bend 72D such that the undulation 72H can be omitted, as illustrated by leg portion or body 272B of retention clip 272 of FIG. 10, for example.

The stator assembly 60 can include one or more secondary retention members 76 (shown in dashed lines in FIGS. 3 and 7) formed adjacent to the end portions 66B, 66C to secure the airfoils 66 to the shrouds 62, 64. Each secondary retention member 76 can include one or more portions arranged about the assembly axis X to define a ring. Each secondary retention member 76 may comprise an elastic material, such as a polymer or other rubber based substance, which may at least partially absorb impacts or dampen vibrations in the surrounding portions of the stator assembly 60. In one example, the secondary retention member 76 is made from a vulcanized silicon rubber.

Material of the secondary retention member 76 can be deposited at suitable locations relative to the stator assembly 60. In the illustrated example, the secondary retention member 76 can be formed in the spaces between the respective shrouds 62, 64, the end portions 66B, 66C and the retention clips 72. The secondary retention member 76 traps or otherwise opposes withdrawal of the retention clips 72 from the airfoil openings 66D, which further reduces the likelihood of the retention clips 72 becoming dislodged from the end portions 66B, 66C and liberation of one or more of the airfoils 66. When in the installed position, the arcuate portion 72F also assists in containing the retention clip 72 in the corresponding end portion 66B, 66C of the airfoil 66 by functioning as an anchor in the secondary retention member 76 and providing relatively more surface area for the secondary retention member 76 to adhere to.

Referring to FIG. 7, the retention clip 72 can be installed as follows. The airfoil 66 is moved in a direction D1 such that the end portion 66B/66C is received through the respective shroud opening 68/70. At position P1, the terminal end T2 of the retention clip 72 is inserted into one of the airfoil openings 66D. The retention clip 72 is rotated in a direction R1 or otherwise moved to position P2 and then to position P3 (shown in phantom), with the arcuate portion 72F of the retention clip 72 inserted or fed through the airfoil opening 66D. The retention clip 72 is rotated or otherwise moved in a direction R2 about the axis E defined by the first leg portion 72B to position P4 (shown in phantom) until the terminal end T1 is substantially aligned with another one of the pair of airfoil openings 66D. Thereafter, the leg portions 72B, 72C can be simultaneously slid a distance, or otherwise moved, in a direction D2 through the airfoil openings 66D until the undulation 72H abuts against the adjacent end portion 66B/66C of the airfoil 66 at position P5 (depicted by retention clip 72 on left side). The secondary retention member 76 (shown in dashed lines) can be formed around portions of the retention clip 72 and the end portion 66B/66C of the airfoil 66 to secure the retention clip 72.

To disassemble the stator assembly 60, at least a portion of the secondary retention member 76 can be removed, and then the retention clip 72 can be moved in a direction opposite to direction D2 to withdraw leg portion 72C of the retention clip 72 from the airfoil openings 66D. The retention clip 72 is then rotated about the axis E in a direction opposite to direction R2 from position P4 to P3, and is rotated in a direction opposite to direction R1 from positions P3 to P1 until the arcuate portion 72F can be withdrawn from the respective airfoil opening 66D.

Figure 8A:
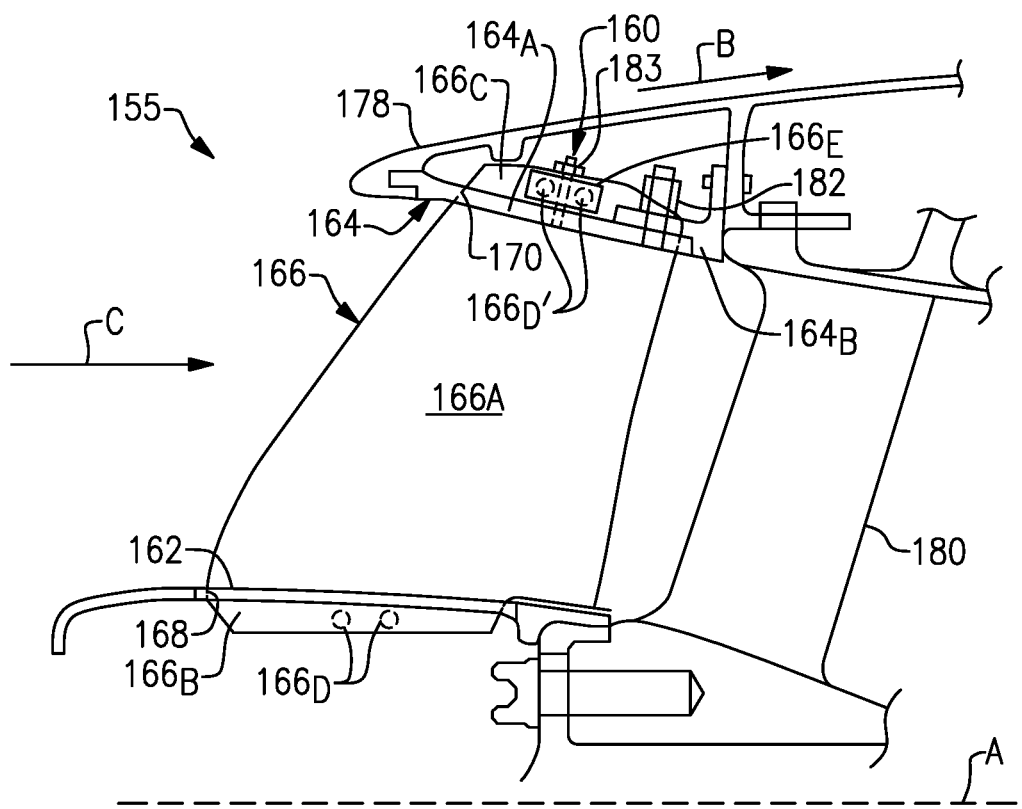
FIG. 8A illustrates an example inlet guide vane assembly.
Figure 8B:
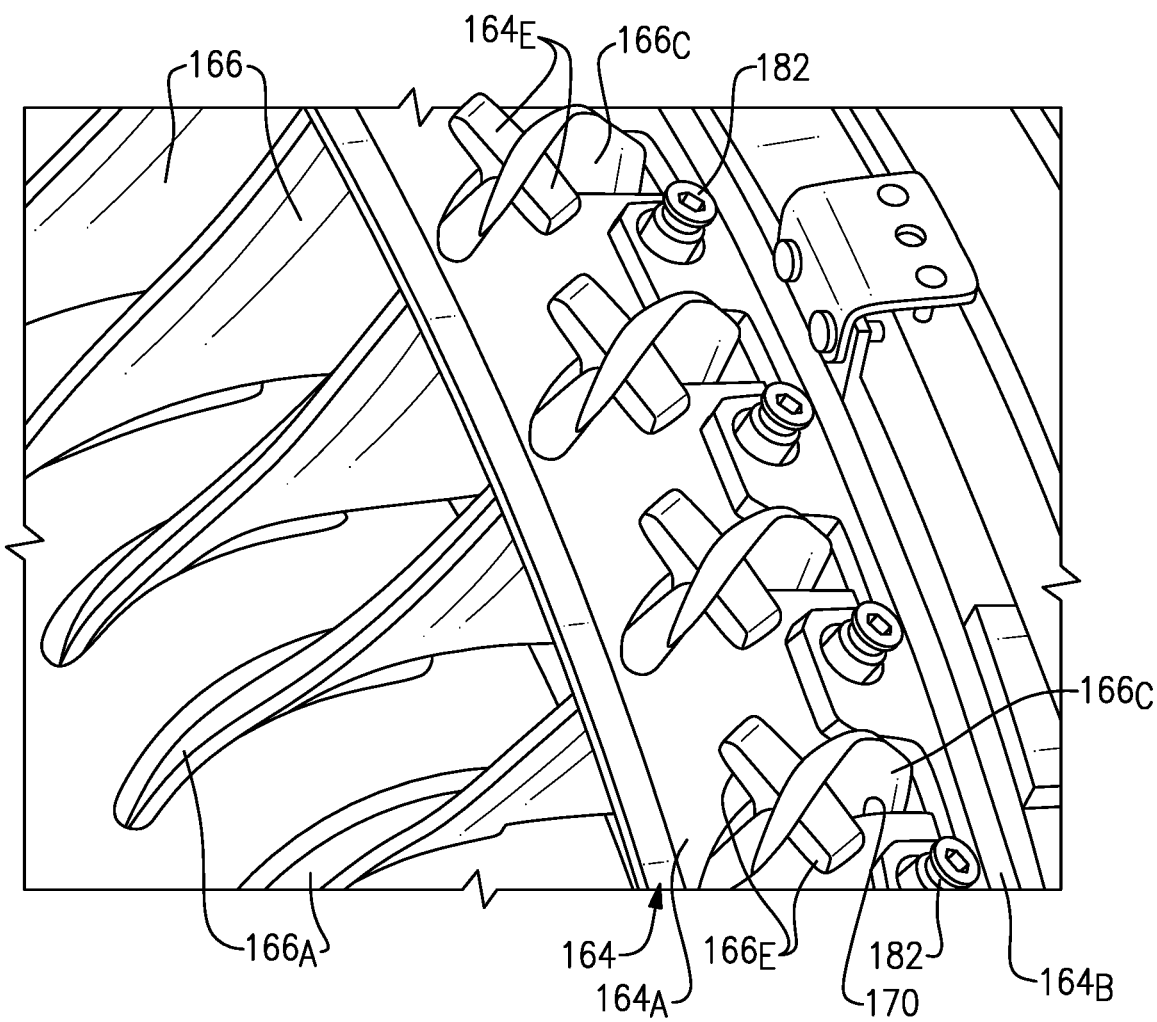
FIG. 8B illustrates a shroud for the inlet guide vane assembly of FIG. 8A.

FIGS. 8A and 8B illustrate an example inlet guide vane assembly 155. The inlet guide vane assembly 155 can be utilized in the engine 20, for example. In the illustrated example, a stator assembly 160 is situated at a splitter 178. The splitter 178 directs airflow to the bypass and core flow paths B, C. The stator assembly 160 can be situated forward of one or more vanes 180 that can be situated upstream of a compressor section, such as the low pressure compressor 44 of engine 20.

The stator assembly 160 includes inner and outer (or first and second) shrouds 162, 164 defining shroud openings 168, 170. One of the end portions 166B, 166C of airfoils 166 (one shown) defines one or more airfoil openings 166D. In the illustrated example of FIG. 8, an inner (or first) end portion 166B of the airfoil 166 defines the airfoil openings 166D. The airfoil openings 166D can be configured to receive a respective retention clip, including any of the retention clips disclosed herein.

The outer shroud 164 can include a forward (or first) portion 164A and an aft (or second) portion 164B mechanically attached or otherwise secured to each other with one or more fasteners 182 (one shown). The forward and aft portions 164A, 164B can each have a generally annular geometry extending about the engine central longitudinal axis A, as illustrated by FIG. 8B. In some examples, the inner shroud 162 can include forward and aft portions similar to the outer shroud 164. In alternative examples, the outer shroud 164 includes a single annular portion (see, e.g., shroud 64 of FIG. 4).

The inner or outer end portions 166B, 166C of airfoils 166 can include an attachment portion such as a set of outwardly extending tabs 166E. One or more secondary retention members (see, e.g., 76 at FIGS. 3 and 7) can be formed adjacent to the tabs 166E. In another example, the tabs 166E are mechanically attached or other secured to the respective inner or outer shrouds 162, 164 with one or more fasteners 183 (one shown in dashed lines in FIG. 8A), such as rivets or bolts and nuts. In some examples, airfoil openings 166D' (shown in dashed lines) can be defined in the outer end portion 166C to receive retention clips, and the tabs 166E can be omitted. The inner end portion 166B and the outer end portion 166C of at least some of airfoils 166 can be secured to the shrouds 162, 164 with one or more retention clips, including any of the retention clips disclosed herein, with one or more secondary retention members (see, e.g., 76 at FIGS. 3 and 7) formed adjacent to each of the end portions 166B, 166C to secure the retention clips.

Figure 9:
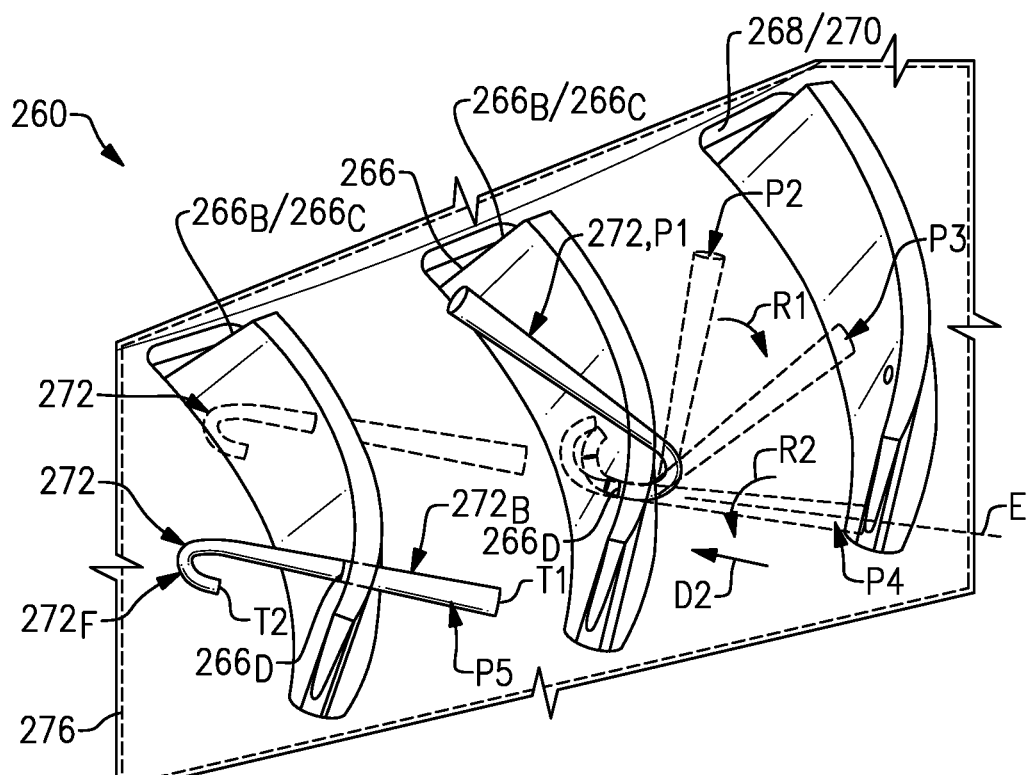
FIG. 9 illustrates a stator assembly according to a second example.
Figure 10:
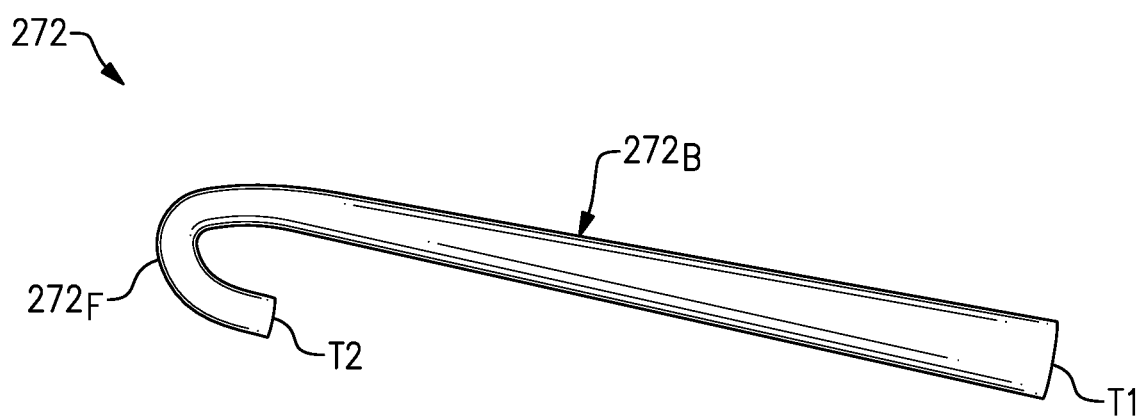
FIG. 10 illustrates a retention clip according to a third example.

FIGS. 9 and 10 illustrate a stator assembly 260 according to another example. The stator assembly 260 includes a plurality of retention clips 272. Each retention clip 272 has an elongated leg portion or body 272B that tapers a distance from a first terminal end T1 toward an arcuate portion 272F that extends from an opposite end of the body 272B. In alternative examples, the arcuate portion 272F is omitted, and the body 272B that tapers a distance between the first terminal end T1 toward the second terminal end T2. The arcuate portion 272F defines a second terminal end T2. In the illustrated example, the body 272B defines a substantially continuous taper between ends T1, T2. In other examples, only a portion of the body 272B is tapered. The tapering can be defined such that ends of the body 272B are positioned approximately equidistant from the respective end portion 266B/266C of the airfoil 266. Each end portion 266B/266C can include one or more retention clips 272 (the second retention clip 272 shown in dashed lines on the left side).

The retention clip 272 is installed as follows. At position P1, the terminal end T2 of the retention clip 272 is inserted into one of the airfoil openings 66D. The retention clip 272 is rotated in a direction R1 to positions P2 through P4 (shown in phantom), with the arcuate portion 272F of the retention clip 272 inserted or fed through the airfoil opening 266D. The retention clip 272 (shown in phantom) can be rotated in a direction R2 about an axis E defined by the body 272B. Thereafter, the body 272B of the retention clip 272 is moved in a direction D2 until the walls of the body 272B bound against the walls of the airfoil opening 266D at position P5 (depicted by retention clip 272 on left side). A secondary retention member 276 (shown in dashed lines) can be formed around portions of the retention clip 272 and the end portion 266B/266C of the airfoil 266 to secure the retention clip 272.

The retention clips 72, 72', 272 disclosed herein can secure airfoils or other components of the engine 20 within relatively small clearances and spaces. The retention clips 72, 72', 272 can also be made in a simplified manner, and can reduce assembly or disassembly time.

One or more embodiments have been described. Nevertheless, it will be understood that various modifications may be made. For example, when reengineering from a baseline engine configuration, details of the baseline may influence details of any particular implementation. Accordingly, other embodiments are within the scope of the following claims.

What is claimed is:

1. A stator assembly of a gas turbine engine comprising:
a first shroud extending about an axis to bound a flow path, the first shroud defining a first shroud opening;
an airfoil including an airfoil body extending from a first end portion, the first end portion received in the first shroud opening and defining at least one airfoil opening; and
at least one retention clip including an arcuate portion extending from a first elongated leg portion, the first elongated leg portion and the arcuate portion received through the at least one airfoil opening such that the at least one retention clip limits movement of the airfoil relative to the first shroud; and
wherein the first shroud bounds a radially inner portion of the flow path, and a second shroud bounds a radially outer portion of the flow path.

2. The stator assembly as recited in claim 1, wherein a length of the first elongated leg portion tapers toward the arcuate portion.

3. The stator assembly as recited in claim 1, wherein the at least one retention clip includes an intermediate portion connecting the first elongated leg portion and a second elongated leg portion.

4. The stator assembly as recited in claim 3, wherein the intermediate portion extends a first length and the arcuate portion extends a second, different length such that a free end of the arcuate portion is offset from an axis defined by the second elongated leg portion.

5. The stator assembly as recited in claim 3, wherein the intermediate portion extends outward from the first and second elongated leg portions.

6. The stator assembly as recited in claim 3, wherein the at least one airfoil opening includes a pair of airfoil openings, and the intermediate portion spans between the pair of airfoil openings when the at least one retention clip is located in an installed position.

7. The stator assembly as recited in claim 1, wherein the first elongated leg portion includes at least one undulation that abuts against the first end portion of the airfoil when the at least one retention clip is located in an installed position.

8. The stator assembly as recited in claim 1, comprising a retention member formed adjacent to the first end portion to trap the at least one retention clip.

9. The stator assembly as recited in claim 1, wherein the stator assembly is situated in a bypass duct.

10. A gas turbine engine comprising:
a fan section including a plurality of fan blades rotatable about an engine axis;
a compressor section in fluid communication with the fan section;
a turbine section driving the fan section; and
a stator assembly comprising:
a first shroud and a second shroud each extending about the engine axis, the first shroud defining an array of first openings, and the second shroud defining an array of second openings;
a plurality of airfoils each including an airfoil body extending between first and second end portions, the first end portion situated in a respective one of the array of first openings, and the second end portion situated in a respective one of the array of second openings, and the first end portion defining at least one airfoil opening; and
a plurality of retention clips each including an arcuate portion extending from a first elongated leg portion, the first elongated leg portion and the arcuate portion of a respective one of the plurality of retention clips received through the at least one airfoil opening of the respective first end portion to limit movement of the plurality of airfoils;
wherein each of the plurality of retention clips includes an intermediate portion connecting the first elongated leg portion and second elongated leg portion; and
wherein the intermediate portion extends outward from the first and second elongated leg portions.

11. The gas turbine engine as recited in claim 10, wherein the stator assembly is situated in bypass flow path aft of the fan section.

12. The gas turbine engine as recited in claim 10, wherein the stator assembly is an inlet guide vane assembly forward of the compressor section.

13. The gas turbine engine as recited in claim 10, comprising a first retention member formed adjacent to each first end portion to trap the plurality of retention clips.

14. The gas turbine engine as recited in claim 10, wherein each second end portion receives a respective one of the plurality of retention clips to limit movement of the plurality of airfoils.

15. The stator assembly as recited in claim 5, wherein the intermediate portion extends a first length and the arcuate portion extends a second, different length such that a free end of the arcuate portion is offset from an axis defined by the second elongated leg portion.

16. The stator assembly as recited in claim 5, wherein the at least one airfoil opening includes a pair of airfoil openings, and the intermediate portion spans between the pair of airfoil openings when the at least one retention clip is located in an installed position.

17. The gas turbine engine as recited in claim 10, wherein:
the at least one airfoil opening includes first and second airfoil openings;
a free end of the arcuate portion is received through the first airfoil opening, the second elongated leg portion is received through the second airfoil opening, and the intermediate portion spans between the first and second airfoil openings when the respective one of the plurality of retention clips is located in an installed position.

18. A stator assembly of a gas turbine engine comprising:
a first shroud extending about a first axis to bound a flow path, the first shroud defining a first shroud opening;
an airfoil including an airfoil body extending from a first end portion, the first end portion received in the first shroud opening and defining at least one airfoil opening; and
at least one retention clip including an arcuate portion extending from a first elongated leg portion, and including an intermediate portion connecting the first elongated leg portion and a second elongated leg portion, the arcuate portion having a hook-shaped geometry including a first free end, the first free end of the arcuate portion and then the first elongated leg portion receivable through the at least one airfoil opening such that the at least one retention clip limits movement of the airfoil relative to the first shroud.

19. The stator assembly as recited in claim 18, wherein the at least one airfoil opening includes a pair of airfoil openings, and the intermediate portion spans between the pair of airfoil openings when the at least one retention clip is located in an installed position.

20. The stator assembly as recited in claim 19, wherein a maximum length of the retention clip is defined between the intermediate portion and the arcuate portion.

21. The stator assembly as recited in claim 19, wherein the arcuate portion is dimensioned such that the first free end faces in a direction towards the intermediate portion, and the second elongated portion includes a second free end that faces in a direction away from the intermediate portion.

22. The stator assembly as recited in claim 21, wherein the intermediate portion extends a first length between the first and second elongated leg portions, the second elongated portion extends along a longitudinal axis between the intermediate portion and the second free end, and the arcuate portion extends a second length greater than the first length such that the first free end of the arcuate portion is offset from a projection of the longitudinal axis of the second elongated leg portion.

23. The stator assembly as recited in claim 21, wherein the second elongated leg portion extends along a longitudinal axis between the intermediate portion and the second free end, and a projection of the longitudinal axis intersects the first free end of the arcuate portion.

24. The gas turbine engine as recited in claim 19, wherein the stator assembly is an inlet guide vane assembly.

* * * * *